(12) United States Patent
Lee et al.

(10) Patent No.: US 7,895,402 B2
(45) Date of Patent: Feb. 22, 2011

(54) METHOD OF ACCESSING DATA IN A DEINTERLEAVING DEVICE

(75) Inventors: Kai-Li Lee, Hsinchu (TW); Jung-Tang Chiang, Hsin-Chu (TW); Meng-Han Hsieh, Hsinchu (TW)

(73) Assignee: Realtek Semiconductor Corp., Hsinchu (TW)

( * ) Notice: Subject to any disclaimer, the term of this patent is extended or adjusted under 35 U.S.C. 154(b) by 605 days.

(21) Appl. No.: 11/933,246

(22) Filed: Oct. 31, 2007

(65) Prior Publication Data

US 2008/0109626 A1    May 8, 2008

(30) Foreign Application Priority Data

Nov. 2, 2006    (TW) ............................... 95140545 A

(51) Int. Cl.
*G06F 13/16*    (2006.01)
(52) U.S. Cl. ..................................... 711/154
(58) Field of Classification Search ....................... None
See application file for complete search history.

(56) References Cited

U.S. PATENT DOCUMENTS 5,745,497 A * 4/1998 Ben-Efraim et al. ........ 714/702
6,754,790 B2    6/2004  Chang

* cited by examiner

*Primary Examiner*—Duc T Doan
(74) *Attorney, Agent, or Firm*—Thomas, Kayden, Horstemeyer & Risley, LLP

(57) ABSTRACT

A deinterleaving device includes a memory space, the memory space being divided into a plurality of N segments with different lengths respectively. A method of accessing data in a deinterleaving device, the method including performing the following steps during a first time cycle: reading first read data from a first address of a first segment; reading second read data from a first address of a second segment, and writing first write data into the first address of the second segment; reading third read data from a first address of a third segment, and writing second write data into the first address of the third segment; repeating the above reading and writing steps until reading $N^{th}$ read data from a first address of an $N^{th}$ segment, and writing $N-1^{th}$ write data into the first address of the $N^{th}$ segment; writing $N^{th}$ write data into the first address of the first segment.

7 Claims, 4 Drawing Sheets

METHOD OF ACCESSING DATA IN A DEINTERLEAVING DEVICE

BACKGROUND OF THE INVENTION

1. Field of the Invention

The present invention relates to data access, and more particularly, to a method of writing data into and reading data out of a memory space in a deinterleaving unit.

2. Description of the Prior Art

Interleavers and deinterleavers are effective to increase the transmission quality of electronic devices. The socalled interleaver utilizes a "write by column"/"read by line" structure. The main idea is to break the data to be transmitted into different packets, and then send the packets to a connected electronic unit. In contrast, a deinterleaver performs the opposite function of the interleaver. Namely, the deinterleaver utilizes a "write by line"/"read by column" structure. The main idea is to recombine the data broken into different packets by the interleaver to thereby reform the original state of the data.

In terms of the electronic circuit design, the interleaver takes the original representation bit order of an index value, and directly views it as each storage unit's memory address of a memory for processing. Because of this, a memory and a memory address generator can be utilized to implement an interleaver. The circuit design for a deinterleaver is very similar to that of an interleaver. The difference only involves reversing the algorithm execution order. In this way, it is apparent that an interleaver and a deinterleaver have a difference being the memory reading and writing modes are reversed. In other words, an interleaver vertically writes data into memory and horizontally reads data from the memory, and a deinterleaver performs the opposite modes. That is, a deinterleaver horizontally writes data into the memory and vertically reads data from the memory.

There are two types of typical deinterleaver operation methods. The first method involves using double memories that rotate performing writing and reading operations. However, this method utilizes a lot of memory and therefore is not suitable for cost sensitive designs. The second method involves providing an extra memory to store all addresses of all reading operations and to perform reading and writing. However, this method not only requires an extra memory, but also requires very intensive calculations.

Although the above described interleaver and deinterleaver encoding methods are effective to increase the transmission quality of a digital product transmitting data, in consideration of ever increasing transmission speeds, the above described techniques require considerable consideration to implement. Additionally, when implementing the "write by line"/"read by column" operations of a traditional interleaver, a great amount of calculations are required to be performed. For this reason, how to design a data accessing method for a deinterleaver that can solve the above—mentioned problems continues to be a very important industry topic.

SUMMARY OF THE INVENTION

One objective of the claimed invention is to provide a method of accessing data in a deinterleaving device. The deinterleaving device includes a memory space, the memory space being divided into a plurality of N segments with different lengths respectively, and access to the memory being performed according to an address pointer and a time pointer. The method comprises performing the following steps during a first time cycle: reading first read data from a first address of a first segment; reading second read data from a first address of a second segment, and writing first write data into the first address of the second segment; reading third read data from a first address of a third segment, and writing second write data into the first address of the third segment; repeating the above reading and writing steps until reading $N^{th}$ read data from a first address of an $N^{th}$ segment, and writing $N-1^{th}$ write data into the first address of the $N^{th}$ segment; writing $N^{th}$ write data into the first address of the first segment; and repeating all the steps in the first time cycle with all the above described addresses shifted by one address unit.

Another objective of the claimed invention is to provide a method of accessing data in a deinterleaving device is disclosed. The deinterleaving device includes a memory space, the memory space being divided into a plurality of N different length segments, and access to the memory being performed according to an address pointer and a time pointer. The method comprises performing the following steps during a first time cycle: reading first read data from a first address in a first segment; reading second read data from the second address and writing first write data in a second address being spaced N-1 addresses from the first address in the first segment; reading third read data and writing second write data in a third address being spaced N-2 addresses from the second address; continuing decreasing the length spaced between the N address and the N-1 address, and repeating the steps of reading and writing data until the length spaced between the N address and the N-1 address is equal to zero; and shifting the first address in the first segment by one address unit and repeating the above-described steps in a second time cycle.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a method of data access for a deinterleaving device being suitable for operation on a transmission signal within the deinterleaving device (e.g., a deinterleaver). The deinterleaving device includes a memory space 1. The memory space 1 is organized as a ladder array; and to facilitate the following explanation of the present invention, the memory space 1 is temporarily organized as a single row. The memory space 1 contains M addresses, and they are divided into N different plurality of segments. Access to each address is performed according to an address pointer and a time pointer. The deinterleaving device, within a current reading cycle time, breaks received data to be written into each address in each segment according to the order that the data was written in the previous write cycle.

Figure 1:
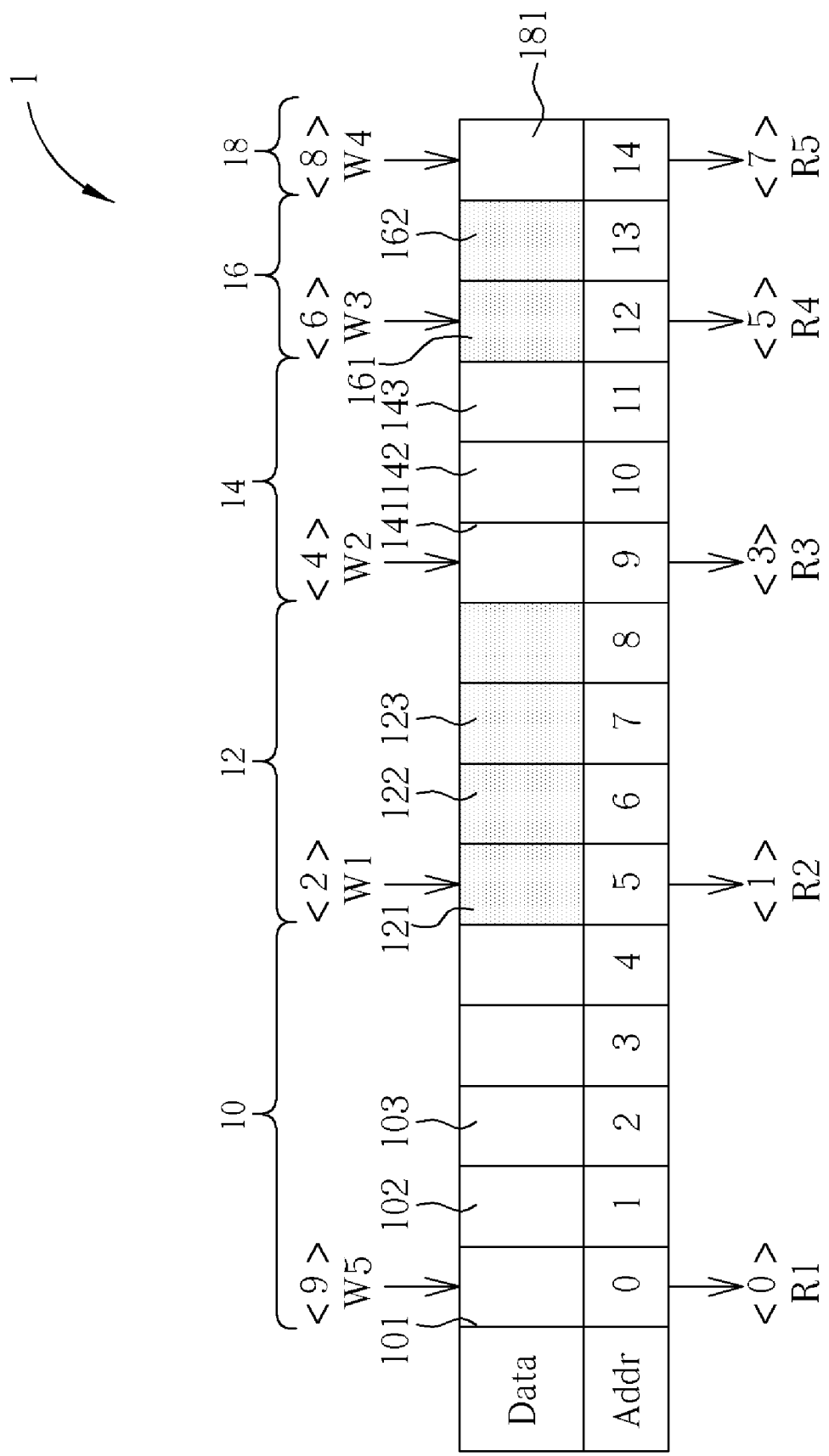
FIG. 1 is a diagram illustrating reading and writing operations of each address of each segment in a first time cycle according to an exemplary embodiment of the present invention.

According to an exemplary embodiment of the present invention, M is equal to 15 and N is equal to 5, as an example. Please refer to FIG. 1. The time indicator points to the first time period of the read/write cycle time and the following steps are performed in a first time cycle of the read/write cycle time:

The address indicator points to a first address 101 in a first segment 10, and first read data R1 is read from first address 101 in the first segment 10.

The address indicator points to a first address 121 in a second segment 12, and second read data R2 is read from the first address 121 in the second segment 12.

The address indicator points to the first address 121 in the second segment 12, and first write data W1 is written into the first address 121 in the second segment 12.

The address indicator points to a first address 141 in a third segment 14, and third read data R3 is read from the first address 141 in the third segment 14. The address indicator points to the first address 141 in the third segment 14, and second write data W2 is written into the first address 141 in the third segment 14.

The address indicator points to a first address 161 in a fourth segment 16, and fourth read data R4 is read from the first address 161 in the fourth segment 16.

The address indicator points to the first address 161 in the fourth segment 16, and third write data W3 is written into the first address 161 in the fourth segment 16.

The address indicator points to a first address 181 in a fifth segment 18, and fifth read data R5 is read from the first address 181 in the fifth segment 18.

The address indicator points to the first address 181 in the fifth segment 18, and a fourth write data W4 is written to the first address 181 in the fifth segment 18.

The address indicator points to the first address 101 in the first segment 10, and a fifth write data W5 is written into the first address 101 in the first segment 10.

Figure 2:
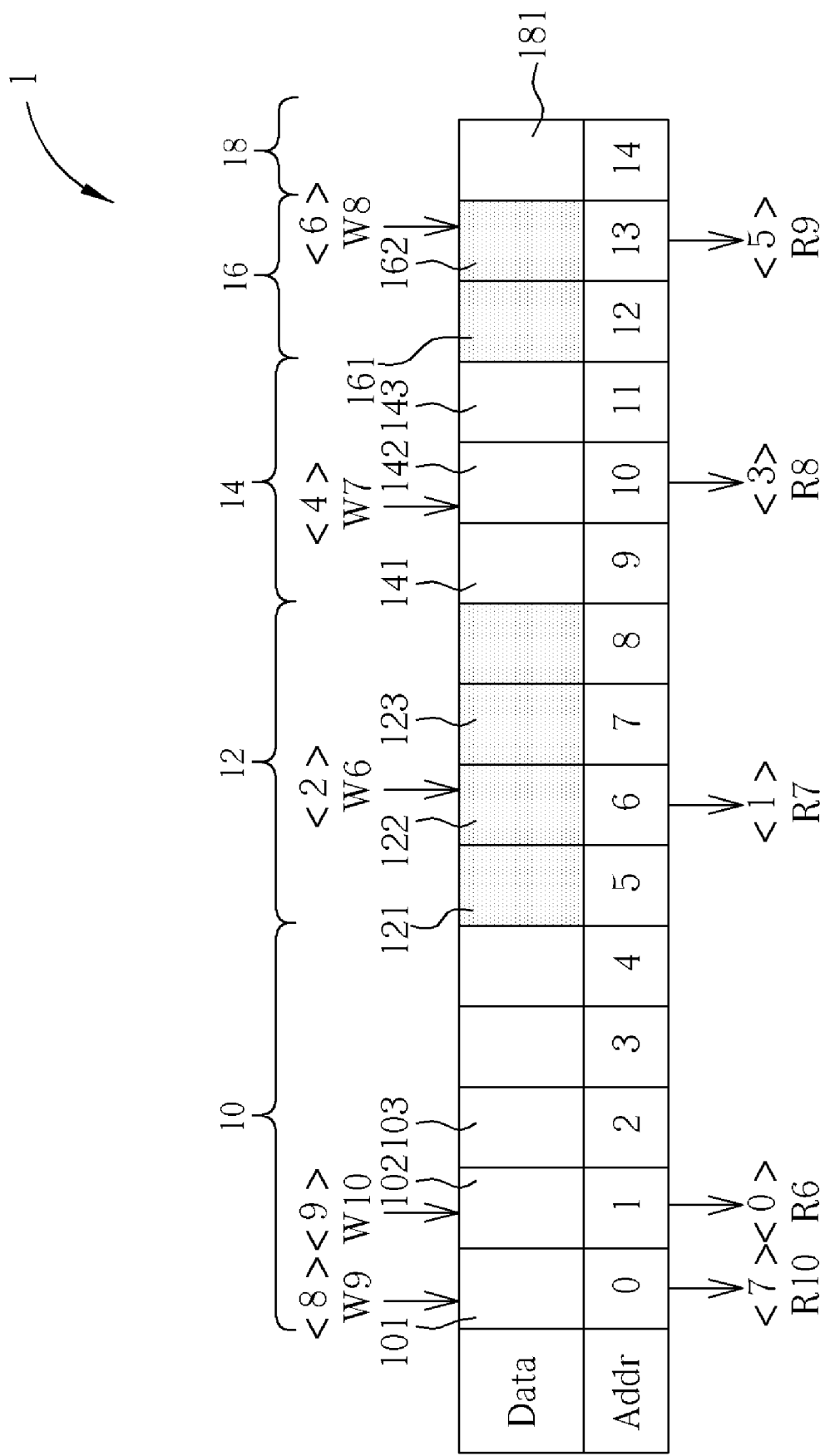
FIG. 2 is a diagram illustrating reading and writing operations of each address of each segment in a second time cycle according to an exemplary embodiment of the present invention.

After the first read/write cycle is completed, the time indicator is incremented. That is, the time indicator points to a second read/write cycle. Please refer to FIG. 2. In the second read/write cycle, the address pointer is shifted by one address. This means that all the read and write addresses shift one address to the right. Afterwards, the following steps are executed:

The address pointer points to a second address 102 in the first segment 10, and sixth read data R6 is read from the second address 102 in the first segment 10.

The address pointer points to a second address 122 in the second segment 12, and seventh read data R7 is read from the second address 122 in the second segment 12.

The address pointer points to the second address 122 in the second segment 12, and sixth write data W6 is written to the second address 122 in the second segment 12.

The address pointer points to a second address 142 in the third segment 14, and eighth read data R8 is read from the second address 142 in the third segment 14.

The address pointer points to the second address 142 in the third segment 14, and seventh write data W7 is written into the second address 142 in the third segment 14.

The address pointer points to a second address 162 in the fourth segment 16, and ninth read data R9 is read from the second address 162 in the fourth segment 16.

The address pointer points to the second address 162 in the fourth segment 16, and eighth write data W8 is written into the second address 162 in the fourth segment 16.

Because the fifth segment 18 doesn't have a second address, the address pointer points to the first segment 10. Execution continues performing read and write operations:

The address pointer points to the first address 101 in the first segment 10, and tenth read data R10 is read from the first address 101 in the first segment 10.

The address pointer points to the first address 101 in the first segment 10, and ninth write data W9 is written to the first address 101 in the first segment 10.

The address pointer points to the second address 102 in the first segment 10, and tenth write data W10 is written into the second address 102 in the first segment 10.

Figure 3:
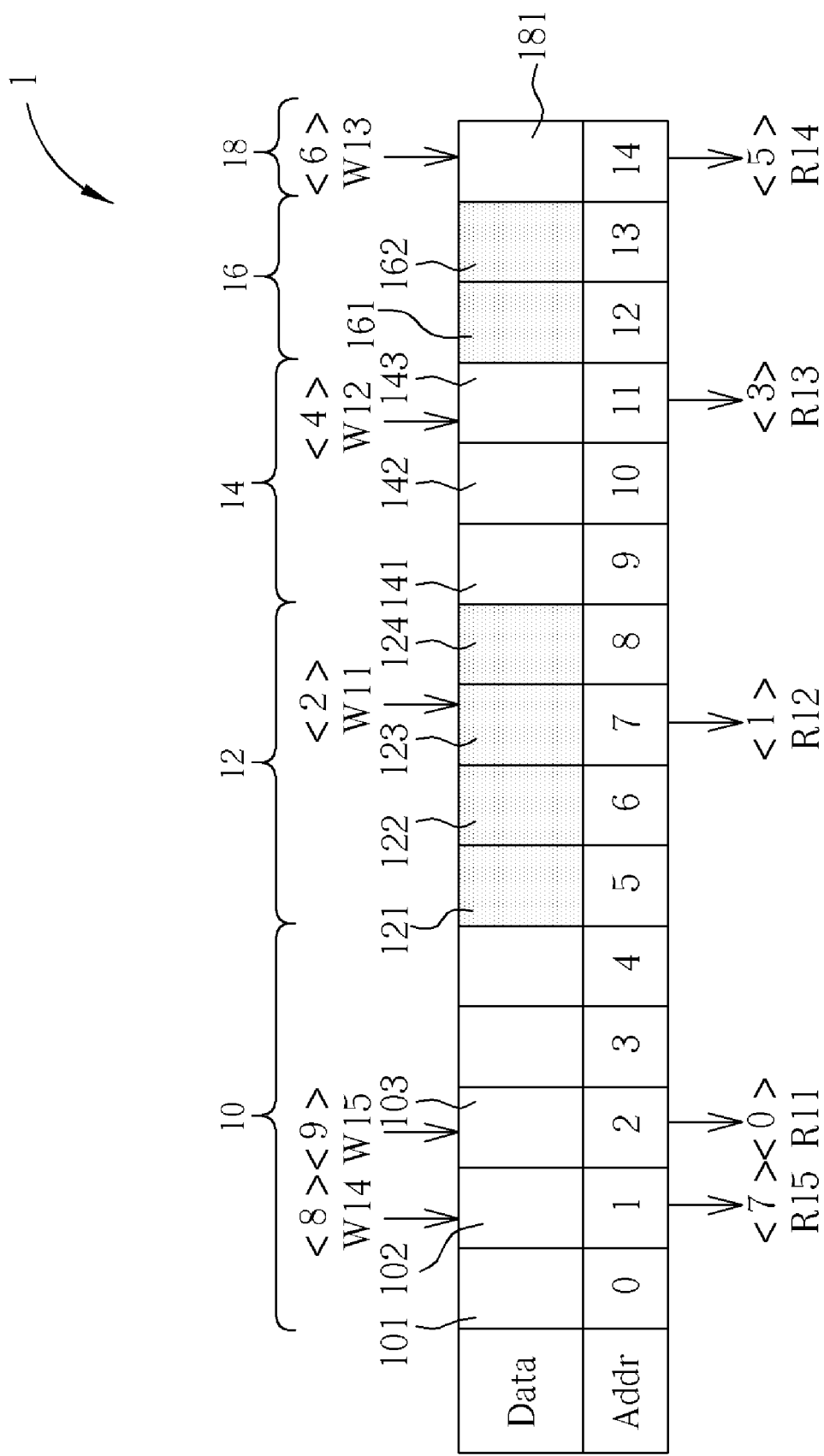
FIG. 3 is a diagram illustrating reading and writing operations of each address of each segment in a third time cycle according to an exemplary embodiment of the present invention.

After the second read/write cycle is completed, the time indicator is incremented. That is, the time indicator points to a third read/write cycle. Please refer to FIG. 3. In the third read/write cycle, all the read and write addresses shift one address to the right. Afterwards, the following steps are executed:

The address pointer points to a third address 103 in the first segment 10, and an eleventh read data R11 is read from the third address 103 in the first segment 10.

The address pointer points to a third address 123 in the second segment 12, and a twelve read data R12 is read from the third address 123 in the second segment 12.

The address pointer points to the third address 123 in the second segment 12, and eleventh write data W11 is written to the third address in the second segment 12.

The address pointer points to a third address 143 in the third segment 14, and thirteenth read data R13 is read from the third address 143 in the third segment 14.

The address pointer points to the third address 143 in the third segment 14, and twelve write data W12 is written to the third address 143 in the third segment 14.

Because the forth segment 16 doesn't have a third address, the address pointer points to the fifth segment 18. Execution continues performing read and write operations:

The address pointer points to the first address 181 in the fifth segment 18, and fourteenth read data R14 is read from the first address 181 in the fifth segment 18.

The address pointer points to second address 102 in the first segment 18, and fifteenth read data R15 is read from the second address 102 in the first segment 10.

The address pointer points to the second address 102 in the first segment 10, and fourteenth write data W14 is written into the second address 102 in the first segment 10.

The address pointer points to the third address 103 in the first segment 10, and fifteenth write data W15 is written into the third address 103 of the first segment 10.

After the third read/write cycle is completed, the time indicator is incremented. That is, the time indicator points to a fourth read/write cycle. All the read and write addresses shift one address to the right.

Figure 4:
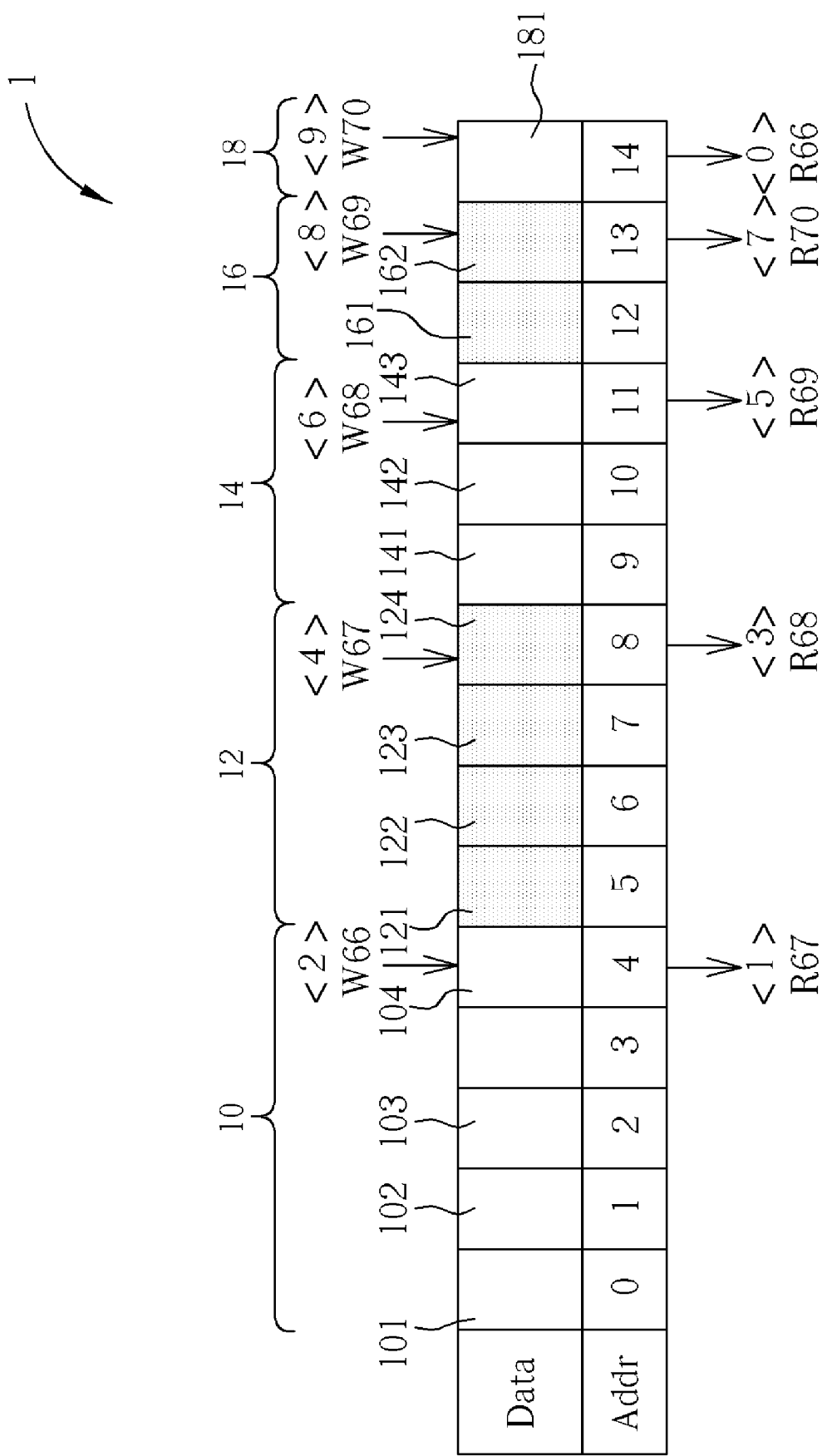
FIG. 4 is a diagram illustrating reading and writing operations of each address of each segment in an $N^{th}$ time cycle according to an exemplary embodiment of the present invention.

When the read/write cycle moves from the fourth to the fifteenth cycle, the address pointer and the time pointer relationship is the same as the above-described first time cycle to the third cycle. For this reason, a repeated description is omitted. Please refer to FIG. 4. When the time pointer points to read write cycle number fifteen, the execution steps proceed as follows:

The address pointer points to the first address 181 in the fifth segment 18, and sixty-sixth read data R66 is read from the first address 181 of the fifth segment 18.

The address pointer points to a fifth address 104 in the first segment 10, and sixty-seventh read data R67 is read from the fifth address 104 of the first segment 10.

The address pointer points to the fifth address 104 in the first segment 10, and sixty-sixth write data W66 is written to the fifth address 104 of the first segment 10.

The address pointer points to a fourth address 124 in the second segment 12, and sixty-eighth read data R68 is read from the fourth address 124 of the second segment 12.

The address pointer points to the fourth address 124 in the second segment 12, and sixty-seventh write data W67 is written to the fourth address 124 of the second segment 12.

The address pointer points to the third address 143 in the third segment 14, and sixty-ninth read data R69 is read from the third address 143 of the third segment 14.

The address pointer points to the third address 143 in the third segment 14, and sixty-eighth write data W68 is written to the third address 143 of the third segment 14.

The address pointer points to the second address 162 in the fourth segment 16, and seventieth read data R70 is read from the second address 162 of the fourth segment 16.

The address pointer points to the second address 162 in the fourth segment 16, and sixty-ninth write data W69 is written to the second address 162 of the fourth segment 16.

The address pointer points to the first address 181 in the fifth segment 18, and seventieth write data W70 is written to the first address 181 of the fifth segment 18.

Please note that because the memory space 1 is a ladder array in this embodiment, the method of this embodiment is performed with a predetermined algorithm. Namely, the time pointer and the address pointer are translated according to the depth of the memory space. This means that with respect to the ladder height, all reading and writing steps are separated by a predetermined address unit. The predetermined address unit is decreased along with each time reading and writing. This makes the deinterleaving device recombine the data in each address of a current reading cycle. However, the above-described material is only an exemplary embodiment of the present invention, and the present invention is not intended to be limited to only this example. For example, each reading or writing operation can be separated by an address unit that is replaced by in an increasing relationship, and this is also within the spirit of the invention.

Please refer to FIG. 1 to FIG. 4. The length of the plurality of segments has a decreasing relationship. The first segment has a length of N address units, the second segment has a length of N−1 address units, and the $N^{th}$ segment has a length of 1 address unit. In order to differentiate the order of reading from and writing to each address in the first time cycle, the second time cycle, the third time cycle, and the $N^{th}$ time cycle, the time cycles are indicated in FIG. 1 to FIG. 4 with <0>-<9>. These labels indicate the order of reading and writing for each address.

Please note that the parameters for the calculation process are set according to the depth of the memory space 1. The address pointer and the time pointer are utilized to access the memory space 1. Because the present invention only involves a simple calculation process, it will not result in a huge amount of calculations and will not require an extra memory to temporarily store data. In this way, the present invention achieves the goal of recombining data.

In the deinterleaving data access method of the present invention, the deinterleaving device includes a memory space 1, and the memory space 1 is divided into N different depth segments. The following steps are performed to access the memory space 1 according to an address pointer and a time pointer:

Read first read data from a first address in a first segment.

In a second address being spaced N−1 addresses from the first address in the first segment, read second read data from the second address and write a first write data.

In a third address being spaced N−2 addresses from the second address, read third read data and write second write data.

Continue decreasing the length spaced between the N address and the N−1 address, and repeating the steps of reading and writing data until the length spaced between the N address and the N−1 address is equal to zero.

Then, in a second time cycle, shift the first address in the first segment by one address unit and repeat the above-described steps.

By performing the above steps, a user can simplify the software design and achieve the goal of data access, and thus design time and complexity are both reduced and operational performance requirements are also greatly reduced.

As stated above, the memory space 1 performs fewer operations, which achieves an increased transmission quality. At the same time, the deinterleaving device memory space 1 requirements are reduced, and the goal of continuous transmission is also met.

From the above-described steps, a user can design simplified and complete program code. Both the design time and complexity are reduced. Furthermore, the calculation requirements of the algorithm are greatly reduced.

Those skilled in the art will readily observe that numerous modifications and alterations of the device and method may be made while retaining the teachings of the invention.

What is claimed is:

1. A method of accessing data in a deinterleaving device, the deinterleaving device including a memory space, the memory space comprising an array storage being divided into a plurality of N segments with different lengths respectively, and access to the memory being performed according to an address pointer and a time pointer; the method comprising:

performing the following steps during a first time cycle:
(a) reading first read data in the array storage from a first address of a first segment;
(b) reading second read data in the array storage from a first address of a second segment, and writing first write data into the first address of the second segment;
(c) reading third read in the array storage data from a first address of a third segment, and writing second write data into the first address of the third segment;

repeating steps (a)-(c) until reading $N^{th}$ read data in the array storage from a first address of an $N^{th}$ segment, and writing $N-1^{th}$ write data into the first address of the $N^{th}$ segment;

writing $N^{th}$ write data into the first address of the first segment; and repeating all the steps in the first time cycle with all the above described addresses shifted by one address unit.

2. The method of claim 1, wherein the plurality of segments have decreasing lengths.

3. The method of claim 2, wherein the length of the first segment is N address units, the length of the second segment is N−1 address units, and the length of the $N^{th}$ segment is 1 address unit.

4. The method of claim 1, further comprising performing the following steps during the second time cycle:

reading $N+1^{th}$ read data in the array storage from a second address of the first segment;

reading $N+2^{th}$ read data in the array storage from a second address of the second segment, and writing $N+1^{th}$ write data into the second address of the second segment;

reading N+3$^{th}$ read data in the array storage from a second address of the third segment, and writing N+2$^{th}$ write data into the second address of the third segment;

repeating the reading and writing steps until reading 2N−1$^{th}$ read data in the array storage from a second address of the N−1$^{th}$ segment, and writing 2N−2$^{th}$ write data into the second address of the N−1$^{th}$ segment;

reading 2N$^{th}$ read data in the array storage from the first address of the first segment, and writing 2N−1$^{th}$ write data into the first address of the first segment; and writing 2N$^{th}$ write data into the second address of the first segment.

5. The method of claim 4, further comprising in a third time cycle, repeating all the steps in the second time cycle with the above described addresses of the second time cycle being shifted by one address unit.

6. The method of claim 1, further comprising in an N+1$^{th}$ time cycle, repeating all the steps in the N$^{th}$ time cycle with the above described addresses of the N$^{th}$ time cycle being shifted by one address unit.

7. A method of accessing data in a deinterleaving device, the deinterleaving device including a memory space comprising an array storage, the memory space being divided into a plurality of N different length segments, and access to the memory being performed according to an address pointer and a time pointer; the method comprising:

performing the following steps during a first time cycle:
(a) reading first read data in the array storage from a first address in a first segment having N address units;
(b) reading second read data in the array storage from a second address in a second segment and writing first write data in the second address in the second segment, wherein a length spaced between the first address in the first segment and the second address in the second segment is N−1 address units;
(c) reading third read data in the array storage from a third address in a third segment and writing second write data in a third address in the third segment, wherein a length spaced between the second address in the second segment and the third address in the third segment is N−2 address units;

continuing decreasing a length spaced between an address in a segment and another address in a consecutive segment, wherein a length of the consecutive segment is one less than a length of the segment, and repeating steps (a)-(c) until the length spaced between the address in the segment and the another address in the consecutive segment is equal to zero;

writing N$^{th}$ write data into the first address of the first segment; and shifting the first address in the first segment by one address unit and repeating the above-described steps in a second time cycle.

* * * * *